Dec. 9, 1930.  C. G. OLSON  1,784,026
SELF LOCKING SCREW
Filed May 17, 1929
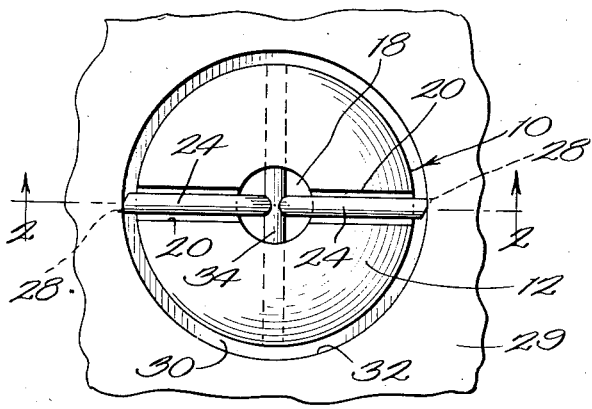
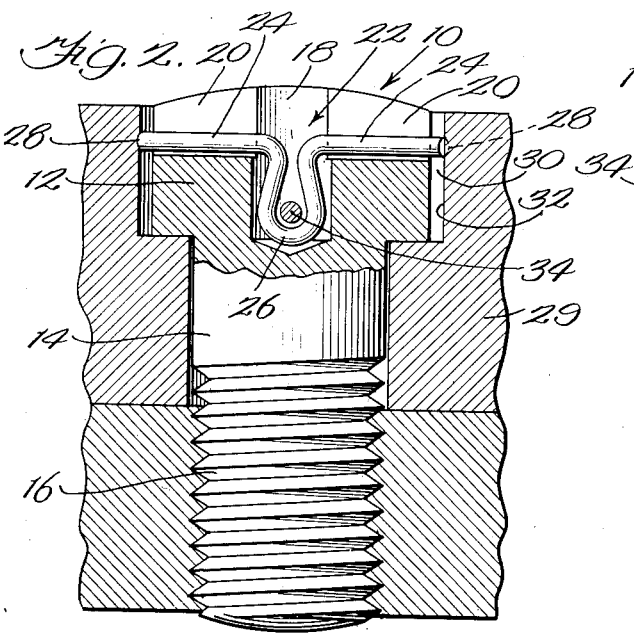
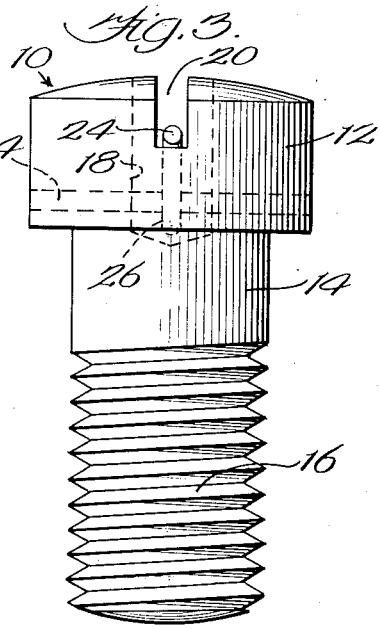
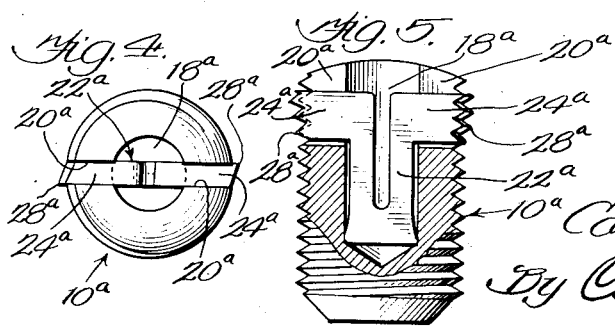
Inventor:
Carl G. Olson
By Cheever, Cox & Moore
Atty's.

Patented Dec. 9, 1930

1,784,026

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

SELF-LOCKING SCREW

Application filed May 17, 1929. Serial No. 363,730.

My invention relates to screws and particularly to screws equipped with locking means.

It is one of the primary objects of my invention to provide a screw which is equipped with simple, durable and efficiently operable means for rendering said screw automatically locked against backing off when the same is tightened within the work.

More specifically, my invention contemplates the provision of screws of various types such as cap screws, fillister head screws, set screws and the like which have improved locking means mounted within the screw.

Still another object of my present invention is to provide screws with resilient locking means which is forced into engagement with the work when the screw is operatively associated therewith and which is adapted to set up positive resistance so as to prevent the screw from being backed off.

A still further and more specific object is to provide screws having heads which are adapted to be received by a countersunk hole with means for positively engaging the surface of the work adjacent said countersunk hole and thereby prevent the screw from being inadvertently backed off.

These and numerous other objects and advantages will be more apparent from the following detailed description when considered in connection with the accompanying drawing, wherein;

Figure 1 is a plan view of a screw constructed and arranged in accordance with the teachings of my invention, the same being shown in operative association with the work;

Figure 2 is a central vertical sectional view taken substantially along the line 2—2 of Figure 1;

Figure 3 is an elevational view of the screw detached from the work, said view being taken from the right of Figures 1 and 2;

Figure 4 is a plan view of a screw of the headless type which is constructed and arranged in accordance with the teachings of my invention; and Figure 5 is a side elevational view partially in section of the self-locking screw shown in Figure 4.

Referring now to the drawing more in detail wherein I have employed like numerals to designate similar parts throughout the various figures, it will be observed that for the purpose of illustrating one embodiment of the invention I have disclosed a fillister head screw designated generally by the numeral 10. This screw comprises a head 12, a shank 14 and a threaded shank portion 16. Centrally of the head 12 I provide a drill hole or aperture 18 and communicating with said aperture on opposite sides thereof are slots 20 of the usual screw driver receiving type.

A resilient locking element designated generally by the numeral 22 is mounted within the slots 20 and the aperture 18. This locking element comprises a pair of oppositely disposed prongs 24 positioned within the slots or recesses 20. The inner extremities of these prongs 24 are formed integral with a U-shaped section 26 and the outer extremities of said prongs are provided with work engaging locking teeth 28. These teeth 28 project outwardly beyond the periphery of the head 12 and are formed angularly or beveled so that as the screw 10 is tightened within the work 29 and the head 12 passes downwardly within a countersunk opening 30 in said work, the teeth 28 will set up a yielding resistance against the walls 32 of said countersunk opening but will not prevent the screw from being forced or tightened within the work. In order to prevent the outward displacement of the resilient locking element 22 as the screw is being driven into the work, I provide a transverse locking pin 34 which passes through the U-shaped section 26. In this manner any tendency for the locking element 22 to be displaced longitudinally of the screw will be positively prevented.

From the foregoing description it will be apparent that when the screw is being tightened within the work by the use of a conventional screw driver or the like (not shown), the teeth 28 of the resilient locking element are eventually carried into yieldable contact with the walls 32 of the countersunk opening 30. These teeth 28, in response to the inherent resiliency of the locking element will become imbedded within the wall 32 and after the screw has been completely tightened against the work, any attempt to unscrew the same will be positively counteracted by the engagement of the teeth with the side walls of the countersunk hole. Thus, a positively acting, self-locking device is provided to prevent inadvertent backing off of the screw. As already pointed out above, the cross rod 34 prevents the outward displacement or inadvertent dislodgement of the resilient locking member. Obviously, various forms of spring or resilient material may be employed such as round, square or flat material to provide the desired resilient locking element and it will be clear that said element may be secured against outward displacement in various ways without departing from my invention.

It will be apparent that my invention contemplates the provision of a self-locking screw which is of very simple, practical and economical construction and which is positively secured against loosening. In order to equip a screw in accordance with the teachings of my invention it is only necessary to provide a transverse slit to present the recesses or slots 20 and a drill hole formed centrally of the screw head to present the aperture 18. The resilient locking element 22 may be formed from stock having the desired characteristics as to hardness and resiliency, said element being very conveniently insertable within the slots 20 and the drill hole 18. It will thus be apparent that my invention enables the provision of a unitary or self-contained screw which is self-locking. It will also be clear that the invention is particularly applicable in instances where screws are to be seated within countersunk openings or holes. The size and yieldable characteristics of the locking element may be governed in accordance with the type of screw with which it is to be used as well as in accordance with the particular work with which the screw is to be associated. In other words, my invention contemplates the provision of self-locking screws of various shapes, sizes and the like and modifications in the shape and form of the resilient locking element to conform to these various sizes and designs may be made without departing from the spirit and scope of my invention. It should also be noted that the locking element in my improved arrangement is so lodged within the screw head as to be practically shielded from view and to be protectively housed. In many screws, as for example the fillister head type shown in the drawing, the transverse slot 20 is the conventional screw driver receiving slot. In such instances the only additional recess or opening to be made in the screw head is the central aperture 18. In other words, my improved locking device may be associated with conventional types of screw heads with a minimum amount of effort and without distorting or changing the shape of the screw head to any appreciable degree.

Referring to Figures 4 and 5, it will be seen that I have disclosed a screw 10-a which is of the headless type. This screw is provided with a central aperture 18-a and slots 20-a communicating therewith. Mounted within these slots or recesses is a resilient element designated generally by the numeral 22-a. This element comprises a pair of oppositely disposed prongs 24-a and a central U-shaped section 22-a which is frictionally retained within the aperture 18-a. It is to be noted that the lower end of the section 22-a is slightly enlarged in order to permit said lower end to be driven within the central aperture and thereby secure the locking element against longitudinal displacement without the necessity of employing an auxiliary fastening means such as the pin 34 already described. The prongs 24-a are provided at their outer extremities with locking teeth 28-a which operate to secure the screw against rotation in the manner already set forth in the description of the self-locking screw shown in Figures 1 to 3 inclusive. It will thus be apparent that my improved self-locking arrangement is capable of application to set-screws of the headless type as well as screws of the fillister head type just described. The resilient locking element 22-a may be conveniently formed from suitable flat stock and it is to be noted that the binding action which takes place at the lower end of the section 22-a has no tendency to affect or impair the resilient characteristic of the locking element. In other words, the locking element 22-a may be driven into the aperture 18-a without causing any lateral distortion or displacement of the prongs 24-a. It will thus be apparent that the locking element is a part of the screw and is so arranged that it will engage the wall of the hole in which the screw is inserted regardless of whether the screw has a head or not, and regardless of whether the portion of the hole in which it engages the work is smooth or threaded.

Having thus described my invention, what I claim as new and desire to secure by Letters Patent is:

1. In a screw assembly of the class described, a screw section having a transverse recess and a central recess extending longitudinally of the screw and enclosed thereby, a resilient locking element including a central U-shaped section which extends within said enclosed central recess, and a locking finger extending laterally from said U-shaped section and positioned in said transverse recess, the outer extremity of said locking finger terminating adjacent the screw periphery and adapted to yieldingly bear against the surface of the work with which the screw may be associated.

2. In a screw assembly of the class described, a screw section having a transverse recess and a central recess extending longitudinally of the screw and enclosed thereby, a resilient locking element including a central U-shaped section which extends within said enclosed central recess, a locking finger extending laterally from said U-shaped section and positioned in said transverse recess, the outer extremity of said locking finger terminating adjacent the screw periphery and adapted to yieldingly bear against the surface of the work with which the screw may be associated, and means traversing said central longitudinal recess for securing said U-shaped section against displacement.

3. In a screw assembly of the class described, a screw section having a transverse recess and a central recess extending longitudinally of the screw and enclosed thereby, a resilient locking element including a central U-shaped section which extends within said enclosed central recess, a locking finger extending laterally from said U-shaped section and positioned in said transverse recess, the outer extremity of said locking finger terminating adjacent the screw periphery and adapted to yieldingly bear against the surface of the work with which the screw may be associated, and a pin traversing said central longitudinal recess and extending through the U-shaped portion of the resilient locking element to secure said element against displacement.

In witness whereof, I have hereunto subscribed my name.

CARL G. OLSON.